(12) United States Patent
Saveski et al.

(10) Patent No.: US 8,919,886 B2
(45) Date of Patent: Dec. 30, 2014

(54) ONE-PIECE SEAT BOTTOM CHASSIS (75) Inventors: Alexander Saveski, South Lyon, MI (US); Ornela Zekavica, Novi, MI (US); Catherine M. Amodeo, Livonia, MI (US)

(73) Assignee: Johnson Controls Technology Company, Holland, MI (US)

( * ) Notice: Subject to any disclaimer, the term of this patent is extended or adjusted under 35 U.S.C. 154(b) by 284 days.

(21) Appl. No.: 13/499,451

(22) PCT Filed: Oct. 1, 2010

(86) PCT No.: PCT/US2010/051081
§ 371 (c)(1),
(2), (4) Date: Mar. 30, 2012

(87) PCT Pub. No.: WO2011/041649
PCT Pub. Date: Apr. 7, 2011

(65) Prior Publication Data
US 2012/0193965 A1 Aug. 2, 2012

Related U.S. Application Data (60) Provisional application No. 61/248,109, filed on Oct. 2, 2009.

(51) Int. Cl.
*B60N 2/68* (2006.01)
*B60N 2/70* (2006.01)
(52) U.S. Cl.
CPC .............. *B60N 2/686* (2013.01); *B60N 2/7058* (2013.01)
USPC ................................ 297/452.18; 297/452.22

(58) Field of Classification Search
USPC ........................................ 297/452.18, 452.22
See application file for complete search history.

(56) References Cited

U.S. PATENT DOCUMENTS

| 3,810,675 | A |   | 5/1974  | Ferrara |
|-----------|---|---|---------|---------|
| 4,147,336 | A |   | 4/1979  | Yamawaki et al. |
| 4,673,215 | A | * | 6/1987  | Yokoyama ............... 297/452.18 |
| 4,969,687 | A | * | 11/1990 | Higuchi et al. .......... 297/452.18 |
| 5,284,381 | A | * | 2/1994  | Aoki et al. ............... 297/452.18 |
| 5,988,756 | A | * | 11/1999 | Aufrere et al. ........... 297/452.18 |
| 6,045,186 | A | * | 4/2000  | Butt et al. ..................... 297/296 |
| 6,356,200 | B1 | * | 3/2002 | Hamada et al. ................ 340/667 |
| 6,361,115 | B1 | * | 3/2002 | Aufrere et al. ........... 297/452.18 |

(Continued)

FOREIGN PATENT DOCUMENTS

FR  2878200   5/2006
FR  2917023  12/2008

(Continued)

OTHER PUBLICATIONS

PCT International Search Report and Written Opinion mailed Nov. 29, 2010.

(Continued)

*Primary Examiner* — David R Dunn
*Assistant Examiner* — Timothy J Brindley
(74) *Attorney, Agent, or Firm* — Fletcher Yoder, P.C.

(57) ABSTRACT

A seat bottom chassis includes a pair of brackets configured to support a seat back chassis, and a cushion pan extending between the pair of brackets. The seat bottom chassis is formed from a single piece of material.

20 Claims, 6 Drawing Sheets (56) References Cited

U.S. PATENT DOCUMENTS

| | | | |
|---|---|---|---|
| 6,412,874 B1* | 7/2002 | Mayer | 297/452.52 |
| 7,137,669 B2* | 11/2006 | Nagayama | 297/452.49 |
| 7,614,680 B2* | 11/2009 | Endo et al. | 296/68.1 |
| 7,878,570 B2* | 2/2011 | Endo et al. | 296/68.1 |
| 8,371,655 B2* | 2/2013 | Nonomiya | 297/452.18 |
| 8,506,016 B2* | 8/2013 | Mizobata | 297/452.18 |
| 8,523,284 B2* | 9/2013 | Yamada et al. | 297/452.18 |
| 8,662,483 B2* | 3/2014 | Yamaguchi et al. | 267/140.4 |
| 2003/0001422 A1* | 1/2003 | Toyota et al. | 297/452.18 |
| 2006/0055225 A1* | 3/2006 | Yasuda et al. | 297/452.18 |
| 2007/0145807 A1* | 6/2007 | Gundall et al. | 297/452.18 |
| 2008/0191539 A1* | 8/2008 | Teufel et al. | 297/452.18 |
| 2011/0006580 A1* | 1/2011 | Ishimoto et al. | 297/452.18 |
| 2013/0187417 A1* | 7/2013 | Seo et al. | 297/216.13 |
| 2013/0193737 A1* | 8/2013 | Morimoto | 297/452.18 |
| 2013/0221725 A1* | 8/2013 | Yamada et al. | 297/452.18 |
| 2013/0341484 A1* | 12/2013 | Yamada et al. | 248/636 |

FOREIGN PATENT DOCUMENTS

| | | |
|---|---|---|
| JP | 64-21031 | 2/1989 |
| JP | 64021032 | 2/1989 |
| JP | 8268132 | 10/1996 |
| JP | 2002-159369 | 6/2002 |
| JP | 2004-057241 | 2/2004 |
| WO | 2010045571 | 4/2010 |

OTHER PUBLICATIONS

Japanese Office Action dated Aug. 27, 2013.
Chinese Office Action dated Nov. 20, 2013.
Japanese Office Action issued Jun. 6, 2014, and mailed Jun. 10, 2014.
Chinese Office Action dated Sep. 3, 2014.

* cited by examiner

ONE-PIECE SEAT BOTTOM CHASSIS

CROSS REFERENCE TO RELATED APPLICATION

This application claims priority from and the benefit of U.S. Provisional Application Ser. No. 61/248,109, entitled "ONE-PIECE SEAT BOTTOM CHASSIS", filed Oct. 2, 2009, which is hereby incorporated by reference in its entirety.

BACKGROUND

The invention relates generally to a one-piece seat bottom chassis.

Vehicle seating typically includes a seat bottom and a seat back to support a driver or passenger. In certain seating configurations, both the seat bottom and seat back include a rigid chassis, cushions, and a fabric covering. The cushions are coupled to the rigid chassis, and the fabric covering is disposed about the assembly. The rigid chassis of the seat bottom serves to support the weight (i.e., vertical load) of the passenger, and couples the seat to a floor of the vehicle. In certain configurations, the seat bottom chassis includes substantially horizontal surfaces for mounting to a seating track, and substantially vertical surfaces for securing the seat back chassis.

Certain seat bottom chassis are constructed from stamped components. For example, a seat bottom chassis may include a right-hand bracket, a left-hand bracket and a cushion pan, each formed by a stamping process. The cushion pan may be coupled to each bracket to form the complete seat bottom chassis structure. Unfortunately, because the left-hand bracket, the right-hand bracket and the cushion pan are different shapes, three different dies, or series of dies, must be constructed to form each part, thereby increasing production costs. Furthermore, the process of coupling the cushion pan to the brackets (e.g., by bolting, welding, etc.) may further increase costs associated with manufacturing the seat bottom chassis.

BRIEF DESCRIPTION OF THE INVENTION

The present invention relates to a vehicle seating system including a seat back chassis. The vehicle seating system also includes a seat bottom chassis including a pair of brackets each including a substantially vertical portion configured to support the seat back chassis, and a cushion pan extending between the pair of brackets. The seat bottom chassis is formed from a single piece of material.

The present invention also relates to a seat bottom chassis including a pair of brackets each including a substantially vertical portion configured to support a seat back chassis. The seat bottom chassis further includes a cushion pan extending between the pair of brackets at a front portion of the seat bottom chassis, and a cross member extending between the pair of brackets aft of the cushion pan. The seat bottom chassis is formed from a single piece of material.

The present invention further relates to a method of manufacturing a seat bottom chassis including stamping the seat bottom chassis from a single piece of material. The seat bottom chassis includes a pair of brackets each including a substantially vertical portion configured to support a seat back chassis, a cushion pan extending between the pair of brackets at a front portion of the seat bottom chassis, and a cross member extending between the pair of brackets aft of the cushion pan.

DETAILED DESCRIPTION

Figure 1:
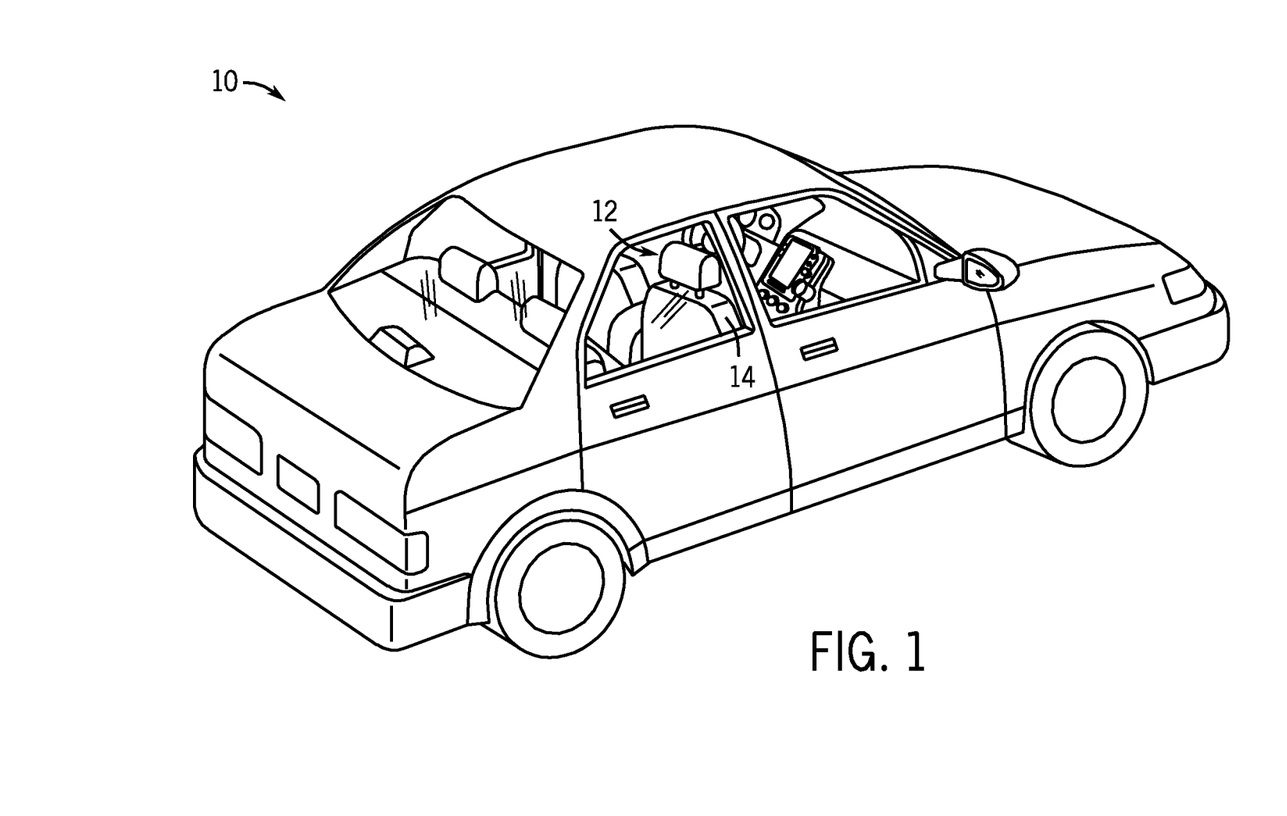
FIG. 1 is a perspective view of an exemplary vehicle that includes seats which may employ a one-piece seat bottom chassis.

FIG. 1 is a perspective view of a motor vehicle 10 including a one-piece seat bottom chassis in accordance with aspects of the present technique. As illustrated, the vehicle 10 includes an interior 12 having a seat 14. As discussed in detail below, the seat 14 includes a seat bottom chassis stamped from a single piece of material. Such a configuration may substantially reduce seat construction costs compared to seat bottoms that include multiple stamped components secured together to form a complete structure. Specifically, seat bottoms having multiple stamped components of different shapes (e.g., brackets, cushion pan, etc.) require separate dies, or separate series of dies, to stamp each component. As will be appreciated, construction cost may increase proportionally to the number of dies due to the expense associated with designing and building each die. In contrast, the present embodiment employs a single die, or single series of dies, to form the seat bottom chassis from one piece of material (e.g., sheet metal). Furthermore, because the entire seat bottom chassis is formed as a single unit, labor and material costs associated with joining the individual components may be substantially reduced or eliminated. In addition, the resultant seat bottom chassis may be lighter than multi-component chassis because of the reduction in number of connections (i.e., fewer weld joints, fewer bolted connections, etc.). Consequently, the one-piece seat bottom chassis may be both lighter and less expensive to produce than conventional chassis formed by coupling multiple components.

Figure 2:
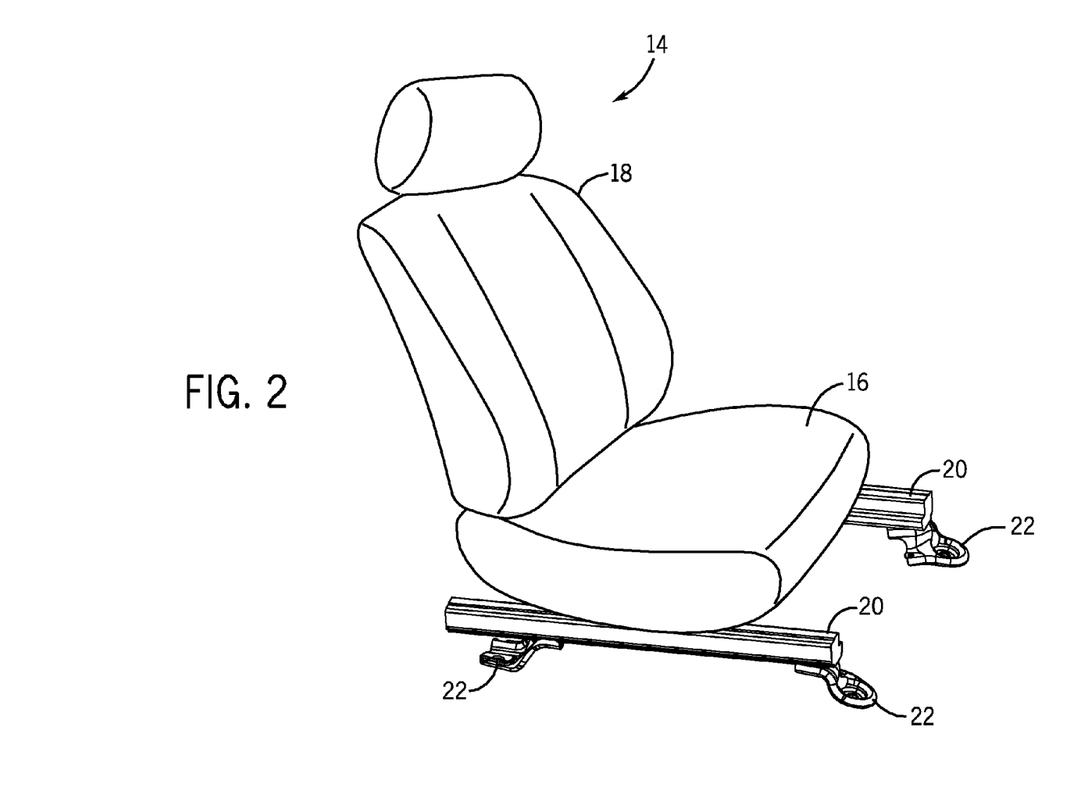
FIG. 2 is a perspective view of the seat shown in FIG. 1.

FIG. 2 is a perspective view of the seat 14 shown in FIG. 1. As illustrated, the seat 14 includes a seat bottom 16 and a seat back 18. In the present embodiment, the seat bottom 16 includes a seat bottom chassis, one or more cushions, and a fabric covering. The seat bottom chassis serves to support the weight of a passenger during normal vehicle operation and during high g-force events (e.g., rapid acceleration or deceleration, etc.). As discussed in detail below, the seat bottom chassis also secures the seat bottom 16 to a floor of the vehicle 10, and provides a mounting surface for the seat back 18. One or more cushions may be coupled to the seat bottom chassis to provide passenger comfort, and the fabric covering may be disposed about the assembly to provide a desired appearance and/or protect the internal components of the seat bottom 16. The seat back 18 may be constructed in a similar manner, i.e., from one or more cushions secured to a rigid chassis and wrapped with a fabric covering. As discussed in detail below, the seat bottom chassis may be stamped from a single piece of material, thereby reducing construction costs compared to chassis formed from multiple components.

As illustrated, the seat bottom 16 is secured to a seat track 20. The seat track 20, in turn, is secured to the floor of the vehicle 10 by mounting feet 22. In certain configurations, the seat 14 may be configured to translate along the seat track 20 to adjust a longitudinal position of a driver or passenger. As will be appreciated, adjustment of the seating position may be either manual or assisted. For example, an electric motor may be configured to drive the seat 14 along the track 20 by a suitable mechanism such as a rack and pinion system. In addition, the seat back 18 may be configured to recline with respect to the seat bottom 16. Adjustment of the seat back 18 may also be either manual or assisted by an electric motor, for example.

Figure 3:
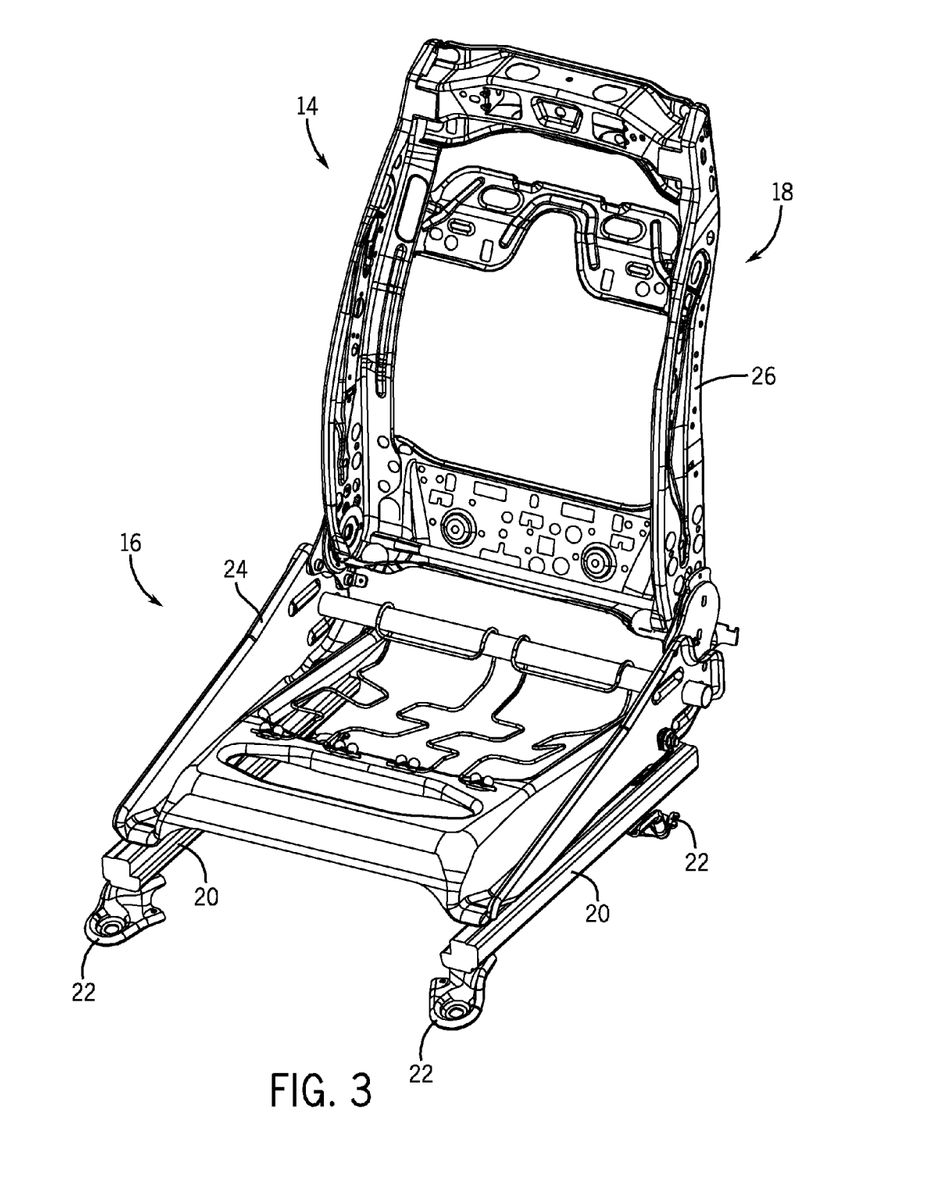
FIG. 3 is a perspective view of the internal structure of the seat shown in FIG. 2, including a seat bottom chassis and a seat back chassis.

FIG. 3 is a perspective view of the internal structure of the seat 14 shown in FIG. 2. As previously discussed, the seat structure is formed by a seat bottom chassis 24 and a seat back chassis 26. The seat bottom chassis 24 is mounted to the seat track 20 to secure the seat 14 to the floor of the vehicle 10. In the present configuration, the seat bottom chassis 24 is configured for manual adjustment of the seat position along the track 20. However, alternative embodiments may include certain features that enable mounting of assisted position adjustment mechanisms, such as electric motors, gears, etc. As discussed in detail below, the seat bottom chassis 24 is stamped from a single piece of material. Specifically, each feature of the seat bottom chassis 24 is formed by a single stamping operation or series of stamping operations. In this manner, manufacturing costs associated with chassis construction may be substantially reduced compared to configurations that employ multiple components secured together to form a complete seat bottom structure.

Figure 4:
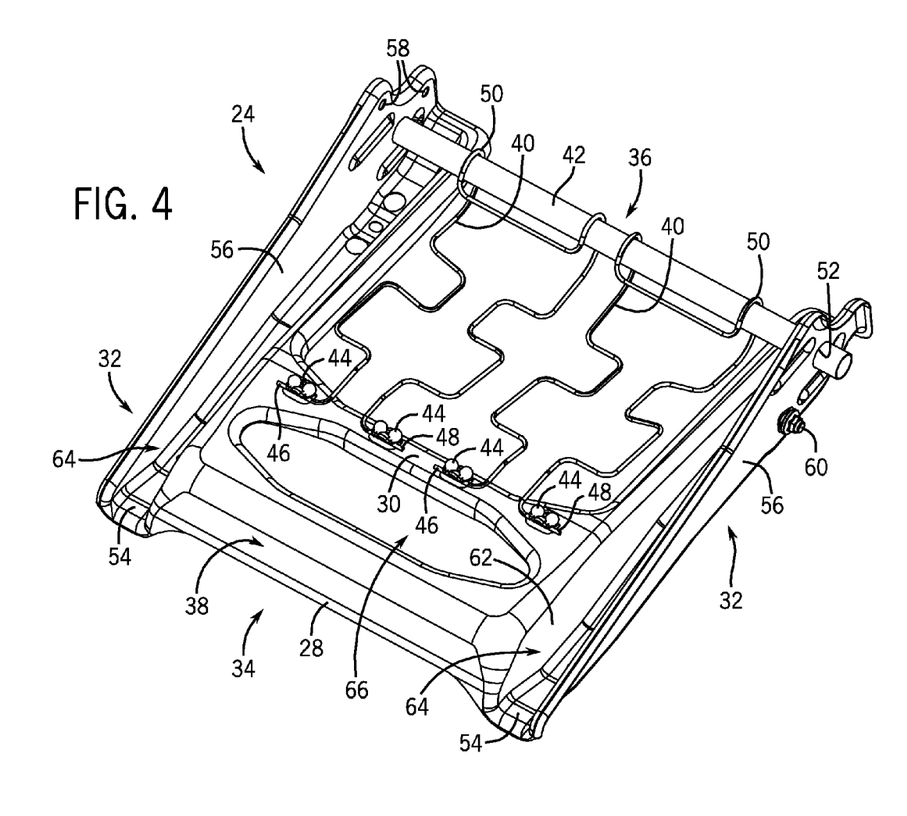
FIG. 4 is a perspective view of the seat bottom chassis shown in FIG. 3.

FIG. 4 is a perspective view of the seat bottom chassis 24 shown in FIG. 3. As illustrated, the seat bottom chassis 24 includes a cushion pan 28, a cross member 30, and a pair of brackets 32, each stamped from the same single piece of material that forms the seat bottom chassis 24. The cushion pan 28 extends between the pair of brackets 32 at a front portion 34 of the seat bottom chassis 24 (i.e., longitudinally opposite from the seat back 18). As will be appreciated, the cushion pan 28 serves to support the cushion disposed above the seat bottom chassis 24. In the present configuration, the cushion pan 28 extends only a short distance toward a rear portion 36 of the chassis 24. Such a cushion pan 28 may be known as a "quarter pan." In alternative embodiments, the cushion pan 28 may extend further toward the rear portion 36 of the seat bottom chassis 24. For example, the cushion pan 28 may extend more than approximately 2%, 5%, 10%, 15%, 20%, 25%, 30%, 40%, 50%, or more of the longitudinal extent of the chassis 24. Furthermore, as illustrated, the cushion pan 28 includes a curved portion 38 configured to establish a rounded surface at the front portion 34 of the seat 14. Such a configuration may provide enhanced passenger comfort.

In the present configuration, the cross member 30 extends between the pair of brackets 32 aft of the cushion pan 28 (i.e., between the cushion pan 28 and the rear portion 36 of the chassis 24). The cross member 30 serves to provide structural rigidity to the seat bottom chassis 24, and establishes anchor points for cushion support springs 40. As illustrated, the cushion support springs 40 extend between the cross member 30 and a spring support structure, such as the illustrated cross tube 42, positioned at the rear portion 36 of the chassis 24. In alternative embodiments, the spring support structure may be stamped from the same single piece of material that forms the seat bottom chassis 24. In the present embodiment, the cross member 30 includes tabs 44 configured to secure the springs 40 to the cross member 30. As illustrated, two wire cushion support springs 40 are employed. However, alternative embodiments may include more or fewer springs 40, such as 1, 2, 3, 4, 5, 6, 7, 8, or more springs 40. Each wire spring 40 includes a first end 46 and a second end 48. As illustrated, the first end 46 is disposed within a first tab 44, and the second end 48 is disposed within a second tab 44. Each cushion support spring 40 extends from the first tab 44 to the cross tube 42, and then loops back to the second tab 44. The spring 40 partially wraps around the cross tube 42 forming a curved portion 50 that secures the spring 40 to the cross tube 42. In the present configuration, the tabs 44 are stamped from the same single piece of material that comprises the seat bottom chassis 24. Such a configuration reduces construction costs compared to securing separate tabs to the chassis 24 after the chassis structure has been formed.

In the present configuration, the cross tube 42 passes through openings 52 within the brackets 32. In certain embodiments, these openings 52 are formed during the stamping process of the one-piece seat bottom chassis 24. The tube 42 may be secured to the brackets 32 by a welded connection, or by expanding the ends of the tube 42 such that contact between the tube ends and the brackets 32 blocks lateral movement of the tube 42. Each bracket 32 also includes a substantially horizontal portion 54 and a substantially vertical portion 56. The substantially horizontal portion 54 is configured to mount to the seating track 20, thereby securing the seat 14 to the floor of the vehicle 10. For example, the substantially horizontal portion 54 may be secured to the seating track 20 with fasteners (e.g., bolts, rivets, etc.) or by a welded connection (e.g., laser welded, arc welded, etc.). Alternatively, the seat bottom chassis 24 may include a tab at the front portion 34 of the substantially horizontal portion 54 configured to interface with an opening in the seating track 20. In such a configuration, the seat bottom chassis 24 may be secured to the seating track 20 by inserting the tab into the opening and attaching the rear portion 36 of the substantially horizontal portion 54 to the seating track 20 with a fastener (e.g., bolt, rivet, etc.). In further embodiments, the tab may be positioned at the rear portion 36 of the substantially horizontal portion 54, and the fastener may be positioned at the front portion 34. In yet further embodiments, the tab may be attached to the seating track 20 and configured to interface with an opening in the substantially horizontal portion 54.

As previously discussed, the substantially vertical portion 56 includes openings 52 configured to receive the cross tube 42. In addition, the substantially vertical portion 56 includes openings 58 configured to secure a reclining mechanism which couples the seat bottom chassis 24 to the seat back chassis 26. As will be appreciated, the reclining mechanism facilitates rotation of the seat back 18 relative to the seat bottom 16. In alternative embodiments, the reclining mechanism may be welded, or otherwise secured, to the substantially vertical portion 56 of the seat bottom chassis 24. The substantially vertical portion 56 of the bracket 32 also includes a seat belt mounting anchor 60 configured to secure a seat belt to the seat bottom chassis 24. Both the substantially horizontal portion 54 and the substantially vertical portion 56 are formed during the stamping process of the one-piece seat bottom chassis 24. In this manner, a single piece of material is formed to include attachment points for each seat bottom structure. Such a configuration may substantially reduce construction costs by forming the chassis structure and each attachment point through a single stamping operation, or series of stamping operations.

As illustrated, the substantially horizontal portion 54, the substantially vertical portion 56, and a sidewall 62 form a channel 64 within each bracket 32. These channels 64 provide structural support for the seat bottom chassis 24 and may be configured to accommodate a variety of devices or structures. For example, each channel 64 may be configured to house a lateral support device, such as an air bladder, a side airbag or a foam cushion. The lateral support device may provide enhanced lateral support to a vehicle passenger, thereby limiting passenger movement during normal vehicle operation and/or during high g-force events. For example, the channel 64 may contain a high-density foam, such as expanded polypropylene (EPP), that extends vertically upwardly beyond the substantially vertical portion 56. The foam will provide enhanced support within lateral regions of the seat bottom 16, thereby limiting lateral movement of the vehicle passenger. In addition, each channel 64 may house an inflatable air bladder configured to provide variable lateral support by selectively inflating and deflating. For example, the passenger may manually activate a switch to inflate the air bladder, thereby providing enhanced lateral support. In addition, the air bladder may be configured to automatically inflate during a high g-force event, such as during a high-speed turn, thereby limiting passenger movement during the event. In further embodiments, the channel 64 may house an airbag configured to rapidly inflate during a high lateral g-force event, such as a side impact, to limit passenger movement.

The channels 64 may also be configured to support a vibration mechanism, such as an eccentric mass shaker, to provide passenger comfort and/or haptic feedback. For example, the vibration mechanism may be manually controlled to enhance passenger comfort while driving. In addition, the vibration mechanism may be automatically engaged to alert a driver of various detected conditions. For example, if the vehicle 10 drifts outside of a lane of traffic, an onboard computer may detect this condition and induce a vibration with the driver seat to warn the driver. This seat vibration functionality is generally known as haptic feedback, and may serve to alert a driver of lane departure, an approaching vehicle or obstacle, exceeding a speed limit, activation of a turn signal, low fuel level, crash avoidance, or other detected conditions.

In further embodiments, the channels 64 may be configured to support a wiring harness extending longitudinally through the seat bottom chassis 24. In such embodiments, a cover may be placed over the channel 64 to form a conduit configured to protect the wires of the harness. In addition, the channel 64 may be configured to support a track for a drawer or sliding footrest that extends from the seat bottom 16. A fixed track may be mounted within each channel 64, and a sliding track may be coupled to the fixed track and configured to extend and retract relative to the channel 64. A storage compartment or drawer may be coupled to the sliding track such that the compartment is exposed when the sliding track is extended and concealed when the sliding track is retracted. Similarly, a footrest may be coupled to the sliding track and selectively exposed to facilitate passenger comfort.

In the illustrated embodiment, the seat bottom chassis 24 includes an opening 66 formed between the cushion pan 28 and the cross member 30. Similar to the channels 64, the opening 66 may be configured to house a variety of devices and/or structures. For example, the opening 66 may be configured to support an anti-submarine device configured to block forward movement of a passenger during a front impact. In certain embodiments, the anti-submarine device is configured to provide a substantially flat seating surface during normal vehicle operation. However, upon detection of a front impact, a portion of the device will rotate vertically upward, thereby providing a force on the passenger legs that substantially reduces or eliminates the possibility of the passenger sliding between the seat bottom and the lap belt. In alternative embodiments, the opening 66 may be configured to support other devices configured to facilitate passenger comfort and/or safety, for example.

Figure 5:
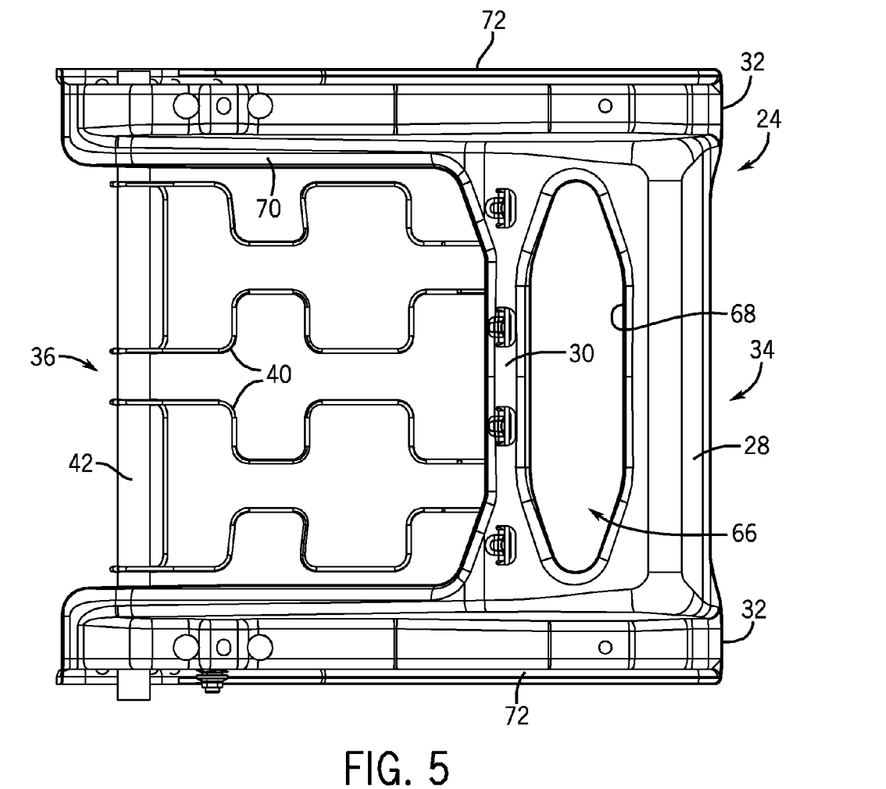
FIG. 5 is a bottom view of the seat bottom chassis shown in FIG. 3.

FIG. 5 is a bottom view of the seat bottom chassis 24 shown in FIG. 3. As illustrated, the seat bottom chassis 24 includes a series of stiffening flanges or lips configured to enhance the structural rigidity of the chassis 24. Specifically, a first flange 68 extends around the opening 66 formed between the cushion pan 28 and the cross member 30. As illustrated, the flange is bent inwardly toward the bottom of the chassis 24. The depth and radius of curvature of the flange 68 may be particularly selected to provide sufficient stiffness to the chassis 24 without substantially increasing its weight. A second flange 70 is formed along the aft side of the cross member 30 and extends along each bracket 32 toward the rear portion 36 of the chassis 24. Similar to the first flange 68, the second flange 70 is bent inwardly toward the bottom of the chassis 24, and has a similar depth and radius of curvature to the first flange 68. Furthermore, a third flange 72 is formed along an upper surface of the substantially vertical portion 56 of each bracket 32. The third flange 72 extends from the front portion 34 to the rear portion 36 of the seat bottom chassis 24. As will be appreciated, alternative embodiments may include more or fewer flanges, and/or different flange configurations. In the present embodiment, the flanges 68, 70 and 72 are formed during the stamping process of the one-piece seat bottom chassis 24. Specifically, the flanges 68, 70 and 72 are stamped from the same piece of material that forms the structure of the chassis 24. As will be appreciated, the flanges 68, 70 and 72 may increase the stiffness of the chassis 24 without significantly increasing the weight of the seat 14.

Figure 6:
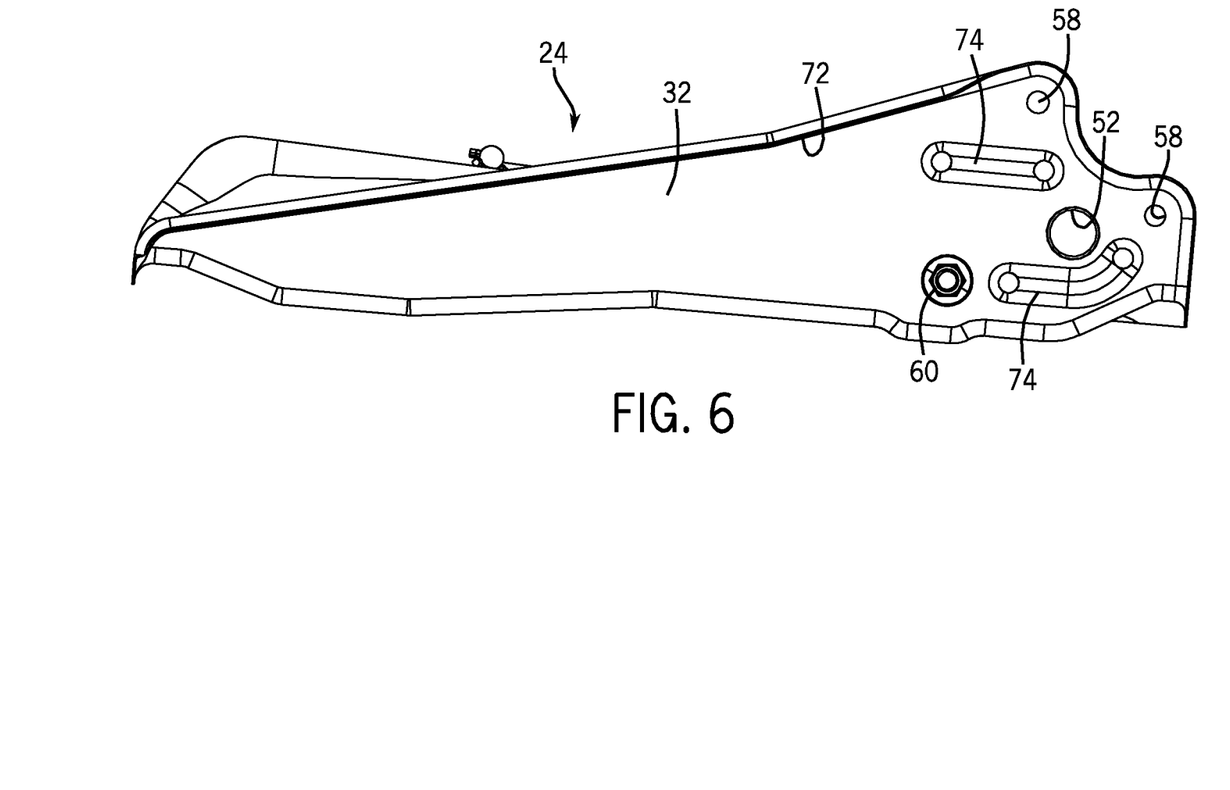
FIG. 6 is a side view of the seat bottom chassis shown in FIG. 3.

FIG. 6 is a side view of the seat bottom chassis 24 shown in FIG. 3. As illustrated, recesses 74 are disposed within the substantially vertical portion 56 of the bracket 32. The recesses 74 are configured to provide additional structural rigidity to the chassis 24 without significantly increasing the weight of the seat 14. While two recesses 74 are disposed within each bracket 32 in the present embodiment, alternative embodiments may employ more or fewer recesses 74. For example, certain embodiments may include 1, 2, 3, 4, 5, 6, 7, 8, or more recesses 74 within each bracket 32. In addition, the length, width, depth and orientation of the recesses 74 may vary in alternative embodiments. For example, the recesses 74 may be configured to provide the seat bottom chassis 24 with sufficient rigidity to maintain structural integrity during a high g-force event (e.g., rapid acceleration, rapid deceleration, etc.). Furthermore, in the present configuration, the recesses 74 are stamped within the brackets 32 during the process of forming the one-piece seat bottom chassis 24. For example, the recesses 74 may be formed after the substantially vertical portions 56 are bent into position, thereby ensuring an accurate location of the stiffening recesses 74.

As previously discussed, each feature of the seat bottom chassis 24 (e.g., the cushion pan 28, the cross member 30, the brackets 32, the flanges 68, 70 and 72, etc.) is stamped from a single piece of material. As will be appreciated, the stamping process may include multiple operations. For example, certain features of the seat bottom chassis 24 may be formed by a progressive stamping process in which a single piece of material (e.g., sheet metal) passes through a series of stamping operations. Such operations may include punching, coining, bending, and/or other stamping processes. In certain configurations, the piece of material passes through multiple dies via an automatic feeding system. The dies may progressively form each feature of the seat bottom chassis 24 until a completed structure is formed. For example, the substantially vertical portions 56 of the brackets 32 may be bent upwardly through a progressive bending operation in which the angle of the substantially vertical portions 56 is progressively increased through a series of dies. Such a stamping operation may reduce the stress applied to the material, thereby increasing the strength of the seat bottom chassis 24. Alternatively, a transfer system may be employed to move the piece of material between the series of dies. For example, a robot may remove the piece of material from a first die, and transfer it to each subsequent die until the completed seat bottom chassis 24 has been formed.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle seating system, comprising:
    a seat back chassis; and
    a seat bottom chassis comprising:
        a pair of brackets each including a substantially vertical portion configured to support the seat back chassis, a substantially horizontal portion configured to mount the seat bottom chassis to a seating track, and a sidewall positioned laterally inward from the substantially vertical portion, wherein the substantially vertical portion, the substantially horizontal portion, and the sidewall form a channel within each bracket; and
        a cushion pan extending between the pair of brackets at a front portion of the seat bottom chassis;
        wherein the seat bottom chassis is formed from a single piece of material, each channel is positioned laterally outward from the cushion pan, each channel at least partially overlaps the cushion pan along a longitudinal direction, and each channel extends beyond a longitudinal extent of the cushion pan from the front portion of the seat bottom chassis to a rear portion of the seat bottom chassis.

2. The vehicle seating system of claim 1, wherein the seat bottom chassis comprises a cross member extending between the pair of brackets aft of the cushion pan.

3. The vehicle seating system of claim 2, comprising a cross tube extending between the pair of brackets.

4. The vehicle seating system of claim 3, comprising one or more cushion support springs extending between the cross member and the cross tube.

5. The vehicle seating system of claim 4, wherein the one or more cushion support springs are coupled to the cross member by tabs disposed within the cross member, and wherein the tabs are formed from the single piece of material.

6. The vehicle seating system of claim 1, wherein the cushion pan comprises a stiffening flange, and wherein the stiffening flange is formed from the single piece of material.

7. The vehicle seating system of claim 1, wherein each bracket comprises a stiffening flange, and wherein the stiffening flange is formed from the single piece of material.

8. The vehicle seating system of claim 1, wherein each bracket comprises a recess configured to stiffen the bracket, and wherein the recess is formed from the single piece of material.

9. The vehicle seating system of claim 2, wherein each channel extends rearwardly beyond a longitudinal position of the cross member.

10. A seat bottom chassis, comprising:
    a pair of brackets each including a substantially vertical portion configured to support a seat back chassis, a substantially horizontal portion configured to mount the seat bottom chassis to a seating track, and a sidewall positioned laterally inward from the substantially vertical portion, wherein the substantially vertical portion, the substantially horizontal portion, and the sidewall form a channel within each bracket;
    a cushion pan extending between the pair of brackets at a front portion of the seat bottom chassis; and
    a cross member extending between the pair of brackets aft of the cushion pan;
    wherein the seat bottom chassis is formed from a single piece of material, each channel is positioned laterally outward from the cushion pan, each channel at least partially overlaps the cushion pan along a longitudinal direction, and each channel extends beyond a longitudinal extent of the cushion pan from the front portion of the seat bottom chassis to a rear portion of the seat bottom chassis.

11. The seat bottom chassis of claim 10, wherein the cushion pan comprises a stiffening flange, and wherein the stiffening flange is formed from the single piece of material.

12. The seat bottom chassis of claim 10, comprising a cross tube extending between the pair of brackets.

13. The seat bottom chassis of claim 12, comprising one or more cushion support springs extending between the cross member and the cross tube.

14. The seat bottom chassis of claim 13, wherein the one or more cushion support springs are coupled to the cross member by tabs disposed within the cross member, and wherein the tabs are formed from the single piece of material.

15. A method of manufacturing a seat bottom chassis, comprising:
    stamping the seat bottom chassis from a single piece of material, wherein the seat bottom chassis comprises:
        a pair of brackets each including a substantially vertical portion configured to support a seat back chassis, a substantially horizontal portion configured to mount the seat bottom chassis to a seating track, and a sidewall positioned laterally inward from the substantially vertical portion, wherein the substantially vertical portion, the substantially horizontal portion, and the sidewall form a channel within each bracket;
        a cushion pan extending between the pair of brackets at a front portion of the seat bottom chassis; and
        a cross member extending between the pair of brackets aft of the cushion pan;
        wherein each channel is positioned laterally outward from the cushion pan, each channel at least partially overlaps the cushion pan along a longitudinal direction, and each channel extends beyond a longitudinal extent of the cushion pan from the front portion of the seat bottom chassis to a rear portion of the seat bottom chassis.

16. The method of claim 15, wherein stamping the seat bottom chassis comprises forming a stiffening flange within the cushion pan.

17. The method of claim 15, wherein stamping the seat bottom chassis comprises forming a stiffening flange within each bracket.

18. The method of claim 15, wherein stamping the seat bottom chassis comprises forming one or more recesses within each bracket, wherein the one or more recesses are configured to stiffen the bracket.

19. The method of claim 15, comprising mounting a cross tube between the pair of brackets.

20. The method of claim 19, comprising mounting one or more cushion support springs between the cross member and the cross tube.

* * * * *